UNITED STATES PATENT OFFICE.

JOHN McAULAY GALLACHER, OF ROXBURY, MASSACHUSETTS.

IMPROVED FERTILIZING COMPOSITION.

Specification forming part of Letters Patent No. 34,825, dated April 1, 1862.

*To all whom it may concern:*

Be it known that I, JOHN MCAULAY GALLACHER, of Roxbury, in the county of Norfolk and State of Massachusetts, have invented a new and Improved Fertilizing Composition; and I do hereby declare that the following is a full, clear, and exact description of the same.

The nature of this invention consists of a composition made by mixing liquid animal matter with animal charcoal and sulphuric acid or oil of vitriol, which composition is a superior fertilizer. The liquid animal matter which I use is obtained by condensing the gases and vapors rising or expelled during the process of charring or burning bones. The animal charcoal which I use is obtained by charring bones, which I grind to a fine powder. The sulphuric acid or oil of vitriol which I use is that usually found in the market. The usual proportions, by weight, in which I mix the above-named ingredients are as follows: animal charcoal, one hundred parts; sulphuric acid, forty-six parts; liquid animal matter, (obtained as stated,) nine parts; but I do not confine myself to those proportions, as they may be considerably varied without materially affecting the character of the compound.

In charring or burning bones the gases and vapors arising or expelled are generally allowed to escape into the atmosphere, thereby rendering it impure and unhealthy and causing a nuisance. All this I avoid by passing the gases and vapors through pipes or a worm immersed in water, into which pipes or worm a jet of steam is injected, whereby the steam, gases, and vapors are condensed into a liquid containing ammonia and animal matter. Of this liquid—called above "liquid animal matter"—I commonly use sufficient to give the superphosphate six per cent. of pure ammonia.

The several ingredients require to be thoroughly mixed in a suitable vessel, and the composition, when properly mixed, produces a cheap and superior fertilizer.

I do not claim broadly the use of sulphuric acid and ground bones in the preparation of fertilizers; but,

Having thus fully described my invention, what I claim as new, and desire to secure by Letters Patent, is—

The within-described fertilizing composition, made of animal charcoal, sulphuric acid, and liquid animal matter, substantially as set forth.

JOHN McAULAY GALLACHER.

Witnesses:
A. STUART,
M. F. KELLEY.